(12) United States Patent
Bengtsson et al.

(10) Patent No.: US 7,870,020 B2
(45) Date of Patent: Jan. 11, 2011

(54) SYSTEM AND METHOD FOR INTERACTIVE MARKETING USING NETWORKED DEVICES

(75) Inventors: Henrik Bengtsson, Lund (SE); Markus Andreasson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 674 days.

(21) Appl. No.: 11/857,561

(22) Filed: Sep. 19, 2007

(65) Prior Publication Data

US 2009/0063270 A1 Mar. 5, 2009

Related U.S. Application Data

(60) Provisional application No. 60/969,848, filed on Sep. 4, 2007.

(51) Int. Cl.
*G06Q 30/00* (2006.01)
(52) U.S. Cl. .................. 705/14.16; 705/14.1
(58) Field of Classification Search .......... 705/14
See application file for complete search history.

(56) References Cited

U.S. PATENT DOCUMENTS

| | | | | |
|---|---|---|---|---|
| 7,316,032 | B2 * | 1/2008 | Tayebi et al. .......... | 705/51 |
| 2002/0165771 | A1 * | 11/2002 | Walker et al. .......... | 705/14 |
| 2005/0125287 | A1 * | 6/2005 | Sureka et al. .......... | 705/14 |
| 2006/0218577 | A1 | 9/2006 | Goodman et al. | |
| 2006/0242014 | A1 * | 10/2006 | Marshall et al. .......... | 705/14 |
| 2007/0265915 | A1 * | 11/2007 | Gould et al. .......... | 705/14 |
| 2008/0052169 | A1 * | 2/2008 | O'Shea et al. .......... | 705/14 |
| 2008/0119168 | A1 * | 5/2008 | Farkas et al. .......... | 455/412.1 |

FOREIGN PATENT DOCUMENTS

| | | |
|---|---|---|
| CA | 2329928 | 6/2002 |
| WO | 0173642 | 10/2001 |
| WO | 2007061780 | 5/2007 |

OTHER PUBLICATIONS

Pousttchi, Key et al., "Success Factors in Mobile Viral Marketing: A Multi-Case Study Approach", International Conference on the Management of Mobile Business, 2007, ICMB 2007, IEEE, PI, Jul. 1, 2007, XP031119408, ISBN: 978-0-7695-2803-8.
International Search Report and Written Opinion from corresponding International Application No. PCT/IB08/000442.
Zhao, Yilin, "Standardization of Mobile Phone Positioning for 3G Systems" IEEE Communications Magazine, IEEE Service Center, (2002), vol. 40, No. 7, pp. 108-116.

\* cited by examiner

*Primary Examiner*—C. M Tarae
(74) *Attorney, Agent, or Firm*—Renner, Otto, Boisselle & Sklar, LLP (57) ABSTRACT

An interactive marketing technique may include distributing a marketing item to electronic devices. The users of the electronic devices may share the marketing item with other electronic devices to progressively attain credit that leads to an ability to use the marketing item. Also, sharing of the marketing item may progressively display larger portions of an image content component of the marketing item on a display of the electronic device.

13 Claims, 4 Drawing Sheets

SYSTEM AND METHOD FOR INTERACTIVE MARKETING USING NETWORKED DEVICES

RELATED APPLICATION DATA

This application claims the benefit of U.S. Provisional Patent Application No. 60/969,848 filed Sep. 4, 2007, the disclosure of which is incorporated herein by reference in its entirety.

TECHNICAL FIELD OF THE INVENTION

The technology of the present disclosure relates generally to marketing over a network and, more particularly, to a system and method for disseminating a marketing item among multiple devices.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many electronic devices form part of a network over which the users may interact using popular interactive activities, such as exchanging messages and sharing data.

Even with the popularity of mobile electronic devices, network service providers (e.g., cellular telephone companies) are deriving diminishing revenue from individual telephone calls and messages as users increasingly favor flat rate subscription plans for unlimited network access.

SUMMARY

The present disclosure describes a method and system that joins the interests of various parties, such as electronic device users, merchants and network service providers. These interests may include users' appreciation of receiving discounts from merchants and other marketing rewards, merchants' interests in attracting more business, and network service providers' interest in deriving revenue from network assets. In particular, disclosed is a technique for users to interactively share a marketing item and progressively attain credit that leads to an ability to use the marketing item. The network service provider may generate revenue from the merchants in exchange for hosting a corresponding interactive marketing service. The merchants, in turn, may gain additional business from the users of the electronic devices.

According to one aspect of the disclosure, a method of marketing a product or service includes distributing a marketing item having an image component to a first electronic device wherein, as distributed, an initial portion of the image component that is less than the entire image component is displayable by the first electronic device; and tracking a passing of the marketing item from the first electronic device to a second electronic device and providing credit to the first electronic device for the passing, the credit permitting the first electronic device to display a portion of the image component that is larger than the initial portion of the image component.

According to one embodiment, the method further includes identifying an electronic device that is the recipient of passes of the marketing item from plural other electronic devices as an indicator that a user associated with the identified electronic device is a candidate for additional marketing related to the product or service.

According to one embodiment of the method, the passing from the first electronic device to the second electronic device includes sending a message related to the marketing item from the first electronic device to the second electronic device and the second electronic device obtaining the marketing item from a server.

According to one embodiment, the method further includes providing a discount for the product or service in response to redemption of the marketing item by a user of one of the first or second electronic devices.

According to one embodiment of the method, credit resulting from a combination of passes from the first electronic device to other electronic devices and passes initiated by at least some of the other electronic devices are aggregated.

According to one embodiment of the method, the aggregated credit permits the first electronic device to display a portion of the image component that is larger than the initial portion of the image component and that corresponds to a value associated with the aggregated credit.

According to one embodiment of the method, a predetermined amount of aggregated credit permits display of the entire image component.

According to one embodiment of the method, each credit has a value in terms of a number of pixels.

According to one embodiment of the method, a remainder portion of the image component that does not form part of the displayable portion is displayable in a faded form.

According to one embodiment of the method, a predetermined amount of aggregated credits qualifies the marketing item for redemption.

According to another aspect of the disclosure, a method of marketing a product or service includes receiving a message that corresponds to a marketing item for the product or service with an electronic device, the marketing item having an image component for which an initial portion of the image component that is less than the entire image component is displayable by the electronic device; and displaying a portion of the image component that corresponds to a combination of the initial portion and an aggregate value of credits that are received in response to the electronic device passing the marketing item to other electronic devices and credits that are received in response to additional passes of the marketing item that are initiated by at least some of the other electronic devices.

According to one embodiment of the method, a marketing application that is executed by the electronic device controls the displayed portion of the image component.

According to one embodiment of the method, a remainder portion of the image component that does not form part of the displayed portion is displayed in a faded form.

According to one embodiment, the method further includes downloading the marketing item from a server following receipt of the message.

According to one embodiment, the method further includes redeeming the marketing item for a discount for the product or service.

According to one embodiment of the method, a predetermined amount of aggregated credit collected by the electronic device results in display of the entire image component.

According to one embodiment of the method, each credit has a value in terms of a number of pixels.

According to one embodiment of the method, a predetermined amount of aggregated credits qualifies the marketing item for redemption.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatus or the like. Other exemplary electronic devices include, but are not limited to, computers, media players and gaming devices.

In the present document, embodiments of an interactive marketing system and method are described primarily in the context of a mobile telephone. It will be appreciated, however, that the exemplary context of a mobile telephone is not the only context and the interactive marketing technique may relate to any type of appropriate electronic device.

Figure 1:
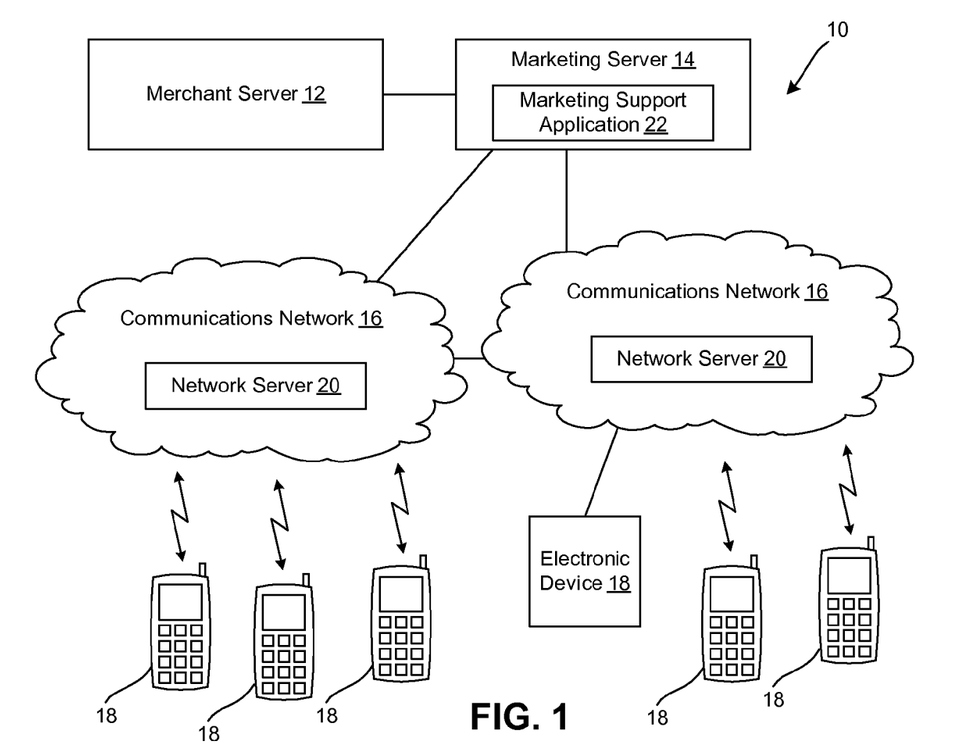
FIG. 1 is a block diagram of an exemplary system for interactive marketing.

Referring initially to FIG. 1, a system 10 for interactive marketing is shown. The system 10 may include a merchant server 12, a marketing server 14, one or more communications networks 16, and a plurality of electronic devices 18. A user or users may be associated with each electronic device 18.

As illustrated, each of the electronic devices 18 may be configured to operate as part of the system 10. In a typical arrangement each electronic device 18 will interface with the system 10 via one of the communication networks 16 that has a predetermined relationship with the electronic device 18. For instance, the electronic device 18 may be registered or subscribe to gain network access through a particular one of the communications networks 16. In other situations, no predetermined relationship may exist between a particular electronic device 18 and a particular network 16, or an electronic device 18 may gain temporary network access from one of the communications networks 16 when outside a coverage area of the communication network 16 with which the electronic 18 has a subscription.

Each communications network 16 may include a server 20 (or servers) for managing calls placed by and destined to the electronic devices 18, managing data transmitted by and destined to the electronic devices 18 and carrying out any other support functions. The server(s) 20 may communicate with the electronic devices 18 via a transmission medium, which may include wireless and/or wired platforms. Thus, the transmission medium may be any appropriate device or assembly, including, for example, a communications tower (e.g., a cell tower), another mobile telephone, a wireless access point, a satellite, etc. Also, portions of the networks 16 may include wireless transmission pathways. As illustrated, the networks 16 may support the communications activity of multiple electronic devices 18 to allow communications to occur between any of the electronic devices 18 and between any of the electronic devices 18 and the marketing server 14. Thus, one of the electronic devices 18 that interfaces with one of the communications networks 16 may communicate with and/or transmit messages to another one of the electronic devices 18 that interfaces with a different one of the communications networks 16.

As will be appreciated, the network servers 20 may be configured as a typical computer systems used to carry out server functions and may include a processor configured to execute software containing logical instructions that embody the functions of the server 20 and a memory to store such software. Similarly, the merchant server 12 and the marketing server 14 may be may be configured as a typical computer systems that are used to carry out the various functions described in greater detail below. Accordingly, the merchant server 12 and the marketing server 14 may each include a processor configured to execute software containing logical instructions that embody the functions of the respective server 12, 14 and a memory to store such software. It will be appreciated that the various disclosed functions may be distributed among additional devices or consolidated among fewer devices. For instance, the responsibilities of the merchant server 12 and the marketing server 14 may be combined into one computer-based system, or one of the network servers 20 may carry out the functions of the merchant server 12 and/or the marketing server 14.

Figure 2:
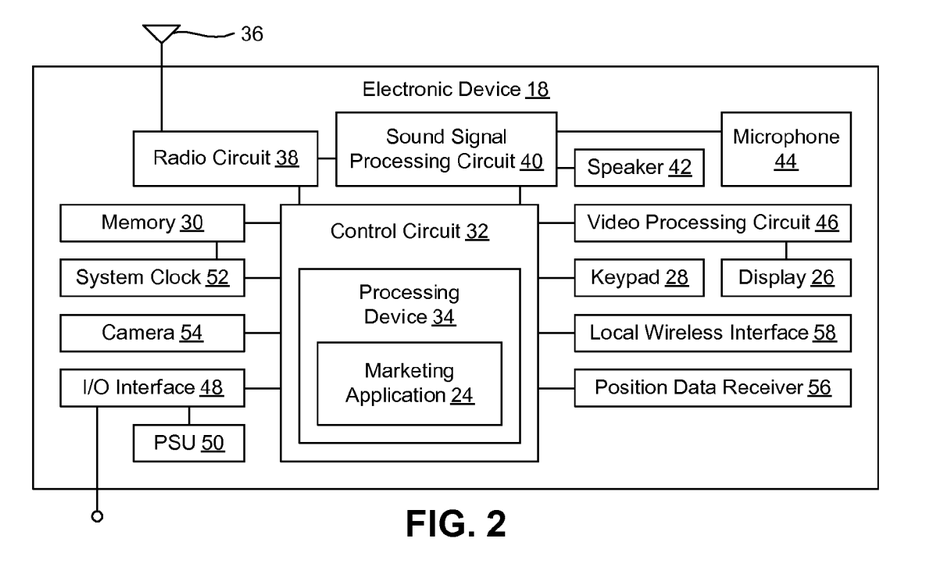
FIG. 2 is a schematic block diagram of an exemplary electronic device that may operate within the system of FIG. 1.

With reference to FIGS. 1 and 2, the marketing server 14 may be configured to store and execute a marketing support application 22. The marketing support application 22 may be embodied as executable code that is resident in and executed by the marketing server 14. In one embodiment, the marketing support application 22 may be a program stored on a computer or machine readable medium. The marketing support application 22 may be a stand-alone software application or form a part of a software application that carries out additional tasks related to the marketing server 14.

The marketing support application 22 may interact with each of the electronic devices 18. More particularly, each of the electronic devices 18 may store and execute a marketing application 24 that interacts with the marketing support application 22 of the marketing server 14. Database structures to store and organize information applicable to the interactive marketing method may be stored and managed by the marketing server 14 and/or with electronic devices 18 in conjunction with the marketing support application 22 and/or the marketing applications 24.

The majority of the electronic devices 18 depicted in FIG. 1 are shown as mobile telephones. As indicated, one or more of the electronic devices 18 may be a device other than a mobile telephone. FIG. 2 shows a block diagram of a mobile telephone as an exemplary electronic device 18. The components of this exemplary electronic device 18 will be described along with a description of some of the functions that the electronic device 18, the network server 20 and/or the marketing server 14 may carry out to implement constituent parts of the interactive marketing method, whether the electronic device 18 is implemented as a mobile telephone or some other type of device. Other types of electronic devices 18 may have comparable display, communication and control/processing components as the illustrated components, even if the other types of electronic devices 18 carry out more or fewer functions.

As indicated, the electronic device 18 includes the marketing application 24. Additional details and operation of the marketing application 24 will be described in greater detail below. The marketing application 24 may be embodied as executable code that is resident in and executed by the electronic device 18. In one embodiment, the marketing application 24 may be a program stored on a computer or machine readable medium. The marketing application 24 may be a stand-alone software application or form a part of a software application that carries out additional tasks related to the electronic device 18.

The electronic device 18 may include a display 26. The display 26 displays information to a user such as operating state, time, telephone numbers, contact information, various menus, etc., that enable the user to utilize the various features of the electronic device 18. The display 26 also may be used to visually display content received by the electronic device 18 and/or retrieved from a memory 30 (FIG. 2) of the electronic device 18. The display 14 may be used to present images, video and other graphics to the user, such as photographs, mobile television content and video associated with games.

A keypad 28 provides for a variety of user input operations. For example, the keypad 28 may include alphanumeric keys for allowing entry of alphanumeric information such as telephone numbers, phone lists, contact information, notes, text, etc. In addition, the keypad 28 may include special function keys such as a "call send" key for initiating or answering a call, and a "call end" key for ending or "hanging up" a call. Special function keys also may include menu navigation and select keys to facilitate navigating through a menu displayed on the display 26. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 26. Also, the display 26 and keypad 28 may be used in conjunction with one another to implement soft key functionality.

The electronic device 18 may include call circuitry that enables the electronic device 18 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VOIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 18 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 30, executing applications to allow user interaction with the data, displaying video and/or image content associated with the data, outputting audio sounds associated with the data, and so forth.

The electronic device 18 may maintain a database of individuals and/or places of business that are known to the user of the electronic device 18, along with telephone numbers, addresses and or electronic mail addresses for the database entries. The database may be arranged as a contact list.

The electronic device 18 may includes a primary control circuit 32 that is configured to carry out overall control of the functions and operations of the electronic device 18. The control circuit 32 may include a processing device 34, such as a central processing unit (CPU), microcontroller or microprocessor. The processing device 34 executes code stored in a memory (not shown) within the control circuit 32 and/or in a separate memory, such as the memory 30, in order to carry out operation of the electronic device 18. The memory 30 may be, for example, one or more of a buffer, a flash memory, a hard drive, a removable media, a volatile memory, a non-volatile memory, a random access memory (RAM), or other suitable device. In a typical arrangement for a mobile telephone, the memory 30 may include a non-volatile memory (e.g., a NAND or NOR architecture flash memory) for long term data storage and a volatile memory that functions as system memory for the control circuit 32. The volatile memory may be a RAM implemented with synchronous dynamic random access memory (SDRAM), for example. The memory 30 may exchange data with the control circuit 32 over a data bus. Accompanying control lines and an address bus between the memory 30 and the control circuit 32 also may be present.

In addition, the processing device 34 may execute code that implements the marketing application 24. It will be apparent to a person having ordinary skill in the art of computer programming, and specifically in application programming for mobile telephones or other electronic devices, how to program a electronic device 18 to operate and carry out logical functions associated with the marketing application 24. Accordingly, details as to specific programming code have been left out for the sake of brevity. Also, while the marketing application 24 is executed by the processing device 22 in accordance with an embodiment, such functionality could also be carried out via dedicated hardware or firmware, or some combination of hardware, firmware and/or software.

The electronic device 18 may include an antenna 36 coupled to a radio circuit 38. The radio circuit 38 includes a radio frequency transmitter and receiver for transmitting and receiving signals via the antenna 36. The radio circuit 38 may be configured to operate in a mobile communications system (e.g., one of the communications networks 16) and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards.

The electronic device 18 further includes a sound signal processing circuit 40 for processing audio signals transmitted by and received from the radio circuit 38. Coupled to the sound processing circuit 40 are a speaker 42 and a microphone 44 that enable a user to listen and speak via the electronic device 18. The radio circuit 38 and sound processing circuit 40 are each coupled to the control circuit 32 so as to carry out overall operation. Audio data may be passed from the control circuit 32 to the sound signal processing circuit 40 for playback to the user. The audio data may include, for example, audio data from an audio file stored by the memory 30 and retrieved by the control circuit 32, or received audio data such as in the form of streaming audio data from a mobile radio service. The sound processing circuit 40 may include any appropriate buffers, decoders, amplifiers and so forth.

The display 26 may be coupled to the control circuit 32 by a video processing circuit 46 that converts video data to a video signal used to drive the display 26. The video processing circuit 46 may include any appropriate buffers, decoders, video data processors and so forth. The video data may be generated by the control circuit 32, retrieved from a video file that is stored in the memory 30, derived from an incoming video data stream that is received by the radio circuit 38 or obtained by any other suitable method.

The electronic device 18 may further include one or more I/O interface(s) 48. The I/O interface(s) 48 may be in the form of typical mobile telephone I/O interfaces and may include one or more electrical connectors. As is typical, the I/O interface(s) 48 may be used to couple the electronic device 18 to a battery charger to charge a battery of a power supply unit (PSU) 50 within the electronic device 18. In addition, or in the alternative, the I/O interface(s) 48 may serve to connect the electronic device 18 to a headset assembly (e.g., a personal handsfree (PHF) device) that has a wired interface with the electronic device 18. Further, the I/O interface(s) 48 may serve to connect the electronic device 18 to a personal computer or other device via a data cable for the exchange of data. The electronic device 18 may receive operating power via the I/O interface(s) 48 when connected to a vehicle power adapter or an electricity outlet power adapter. The PSU 50 may supply power to operate the electronic device 18 in the absence of an external power source.

The electronic device 18 also may include a system clock 52 for clocking the various components of the electronic device 18, such as the control circuit 32 and the memory 30.

The electronic device 18 may include a camera 54 for taking digital pictures and/or movies. Image and/or video files corresponding to the pictures and/or movies may be stored in the memory 30.

The electronic device 18 also may include a position data receiver 56, such as a global positioning system (GPS) receiver, Galileo satellite system receiver or the like. The position data receiver 56 may be involved in determining the location of the electronic device 18.

The electronic device 18 also may include a local wireless interface 58, such as an infrared transceiver and/or an RF interface (e.g., a Bluetooth interface), for establishing communication with an accessory, another mobile radio terminal, a computer or another device. For example, the local wireless interface 58 may operatively couple the electronic device 18 to a headset assembly (e.g., a PHF device) in an embodiment where the headset assembly has a corresponding wireless interface.

Figure 3:
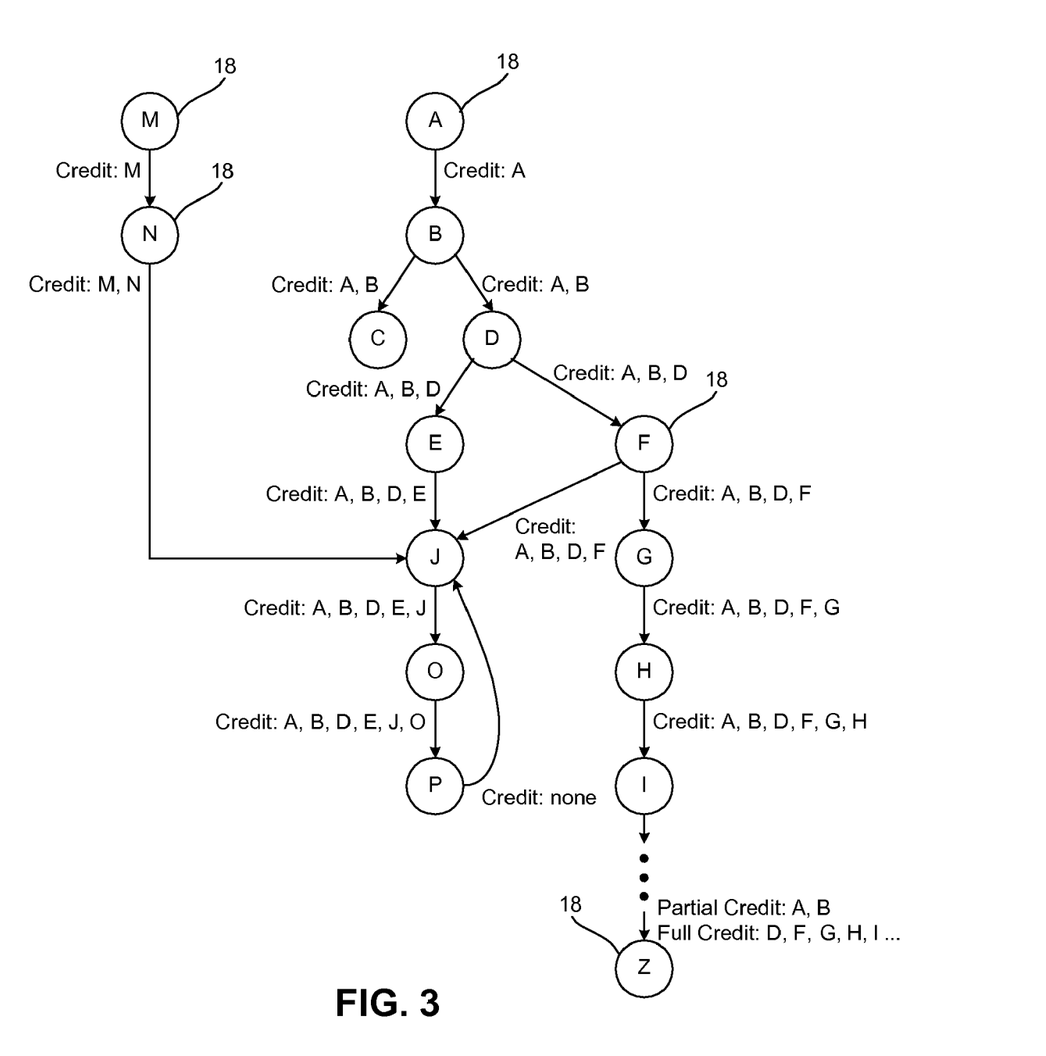
FIG. 3 is an exemplary progression of marketing item passes that may occur within the system of FIG. 1.

With additional reference to FIG. 3, a method of interactive marketing using the system 10 will be described. The method involves the "passing" of a marketing item from one electronic device 18 to one or more other electronic devices 18 that may, in turn, pass the marketing item to additional electronic devices 18. In the illustration of FIG. 3, the various electronic devices 18 are represented by circles containing a letter. Each letter is used to identify an individual electronic device 18 that is present as part of the system 10. As such, in the description of the method of interactive marketing using the exemplary chart of FIG. 3, the individual electronic devices 18 may be referred to by the letter identifiers. For instance, the electronic device 18 represented by the circle containing the letter A will be referred to as device A.

The marketing item may be in the form of a data file that includes a displayable image component. Passing of the marketing item from one electronic device 18 to another electronic device 18 may involve transmitting the associated data file between the devices 18. Alternatively, and as described below, the passing may involve sending a message from a passing electronic device 18 to a target electronic device 18 and, in turn, the target device 18 may acquire the marketing item from the marketing server 14.

As indicated, a component of the marketing item may be in the form of an image (e.g., graphic or photograph) that may be displayed on the display 26 of the electronic device 18. But other types of content are contemplated, such as audio content and/or video content.

The marketing item may have some redeemable value once the electronic device 18 accumulates a threshold amount of credit for the marketing item. In this sense, the marketing item may be or may contain a discount voucher, a discount code, a coupon, a certificate, a reward voucher, a reward code or similar instrument. In other embodiments, the marketing item itself may have value and/or could be an electronic promotional item (e.g., a song or a video). The process of obtaining credit so that the marketing item may be used by the user of the electronic device 18 will be described below.

For purposes of description by way of an example, the marketing item could be a voucher good for a percent discount towards the purchase of a product or service from a merchant that is associated with the merchant server 12. Alternatively, the redeemable value of the marketing item may be specified as a monetary amount. As an example, the marketing item may be a voucher for fifty percent off of the regular price of a pair of denim jean pants. The marketing item may be initially distributed from the merchant server 12 or the marketing server 14 to one or more selected electronic devices 18. The electronic devices 18 that initially received a marketing item may be limited in number and/or selected based on predetermined criteria, such as membership status, previous purchasing behavior, registration as a desired recipient for marketing items, and so forth.

When the marketing item is received by one of the electronic devices 18, the marketing item may be partially displayable. For instance, protections associated with the marketing item may allows only parts of the marketing item to be displayed on the display. The parts that are not displayable may appear as blank (e.g., black or white). In one embodiment, the displayable parts of the marketing item may be displayed with full color saturation and the remainder of the marketing item may be displayed with reduced color saturation to appear "faded." The displayable parts may be arranged in blocks so that patches of the marketing item may be clearly viewed. Alternatively, the displayable parts may be a contiguous portion of the marketing item. For instance, the marketing item may be increasing displayable from left to right to mimic the manner in which typical computer status bars are displayed as a task is undergoing completion.

In one embodiment, when the marketing item is first received by an electronic device, a predetermined number or percentage of pixels of the marketing item may be displayed. For instance, every other pixel or every third pixel may be displayed. This may provide enough visual information to portray the general nature of the marketing item but also convey that the marketing item is not complete. The pixels that are not displayed may be left blank (e.g., displayed as black or white) or may appear in a faded form.

Passing of the marketing item among the electronic devices may attribute credit to the electronic device 18. The credit, in turn, may make additional portions of the marketing item available for display. Once passing activity in the aggregate has resulted in enough credit to display the entire marketing item, the user of the electronic device 18 may redeem the marketing item or use the marketing item without restriction. Alternatively, the value of the marketing item may be prorated based on the amount of passing activity that is credited to the electronic device 18 (e.g., if fifty percent of the previously non-displayable portion has been turned into displayable content, then the marketing item may have half of its full value).

One manner in which credit may be attributed to the electronic device 18 is to pass the marketing item to another electronic device. Using the example of displaying a predetermined number of pixels of the marketing item, the marketing item may be one-third displayable when initially received by a first electronic device 18. For instance, many mobile telephones have a quarter video graphics array (QVGA) display of approximately 75,000 pixels. If one third of the marketing item were deemed to be initially viewable, then about 25,000 of the 75,000 pixels would be displayed on the display 26.

When the electronic device 18 passes the marketing item to a second electronic device, the first electronic device may receive a credit of a predetermined number of pixels, such as one pixel, ten pixels, twenty-five pixels, one hundred pixels, 1,000 pixels, etc. The number of pixels associated with a credit may depend on how fast the associated merchant would like users of electronic device to be able to redeem the marketing item. For instance, a credit value for a low monetary value coupon on a commonly purchased item may be high so that require little passing action will result in redeem-ability of the marketing item. But a low credit value may be associated for a high monetary value discount or when the merchant desires wide distribution of the marketing item by frequent passing of the marketing item.

Upon receipt of a credit, the display of the marketing item may be refreshed to show a greater portion of the marketing item. Also, a counter or status indicator may be displayed to show the user how much more credit the user needs to be able to redeem the marketing item.

Continuing with the example, if the first electronic device 18 were to pass the marketing item to a third electronic device 18, the first electronic device 18 may received another credit. Also, if the second electronic device 18 were to pass the marketing item to a fourth electronic device 18, the first electronic device 18 may receive a credit and/or the second electronic device 18 may receive a credit. As the passing continues, sufficient credit will be attributed to the first electronic device 18 as the originator of the lines of passing and the marketing item eventually will become redeemable. At that point, the user may present the marketing item to the merchant for redemption.

A number of redemption possibilities exist. For instance, the user of the electronic device may bring the electronic device or a printed copy of the marketing item to a physical location for redemption. In another situation, the complete marketing item may reveal a code that the user may enter into an Internet webpage hosted by the merchant to complete an "on-line" transaction. The marketing server 14 may track which electronic devices 18 have satisfied the criteria to redeem the marketing item and convey this information to the merchant server 12 to reduce unauthorized redemption of the marketing item or to assist the merchant in matching an identity of the electronic device (e.g., by telephone number, network address, user name, etc.) to a redeemable marketing item. Also, the marketing server 14 and/or the merchant server 12 may track the activity of the electronic devices 18 and conduct data mining to identify potential targets for future marketing items, identify what types of marketing items have commercial success, and gain other valuable business information.

In one embodiment, the entity that operates one or more of the communications networks 16 or another party may operate the marketing server 14. By virtue of hosting the marketing support application 22 and related services, this party may collect a fee from the merchant associated with the marketing item. The fee may be a fixed fee per marketing item, or may be tied to the number of times the marketing item is redeemed. In another embodiment, the fee may be tied to the number of times the marketing item is passed from one electronic device to another.

With continued reference to FIG. 3, illustrated is an example depicting some of the manners in which passing of a marketing item may be passed among plural electronic devices 18. In the example, devices A and M are the initial recipients of the marketing item from the merchant server 12 or the marketing server 14. While the example of FIG. 3 shows the passing of a marketing item from one electronic device 18 to only one or two other electronic devices 18, it will be appreciated that anyone electronic device 18 may pass the marketing item to more than just one or two other electronic devices 18.

In the example, device A passes the marketing item to device B. In return, device A receives a credit. If the marketing item had 75,000 pixels, of which 25,000 were initially viewable, and the credit were worth 100 pixels, the device A would display 25,100 pixels after the pass to device B. Device B is shown as passing the marketing item to devices C and D. For each of these passes, both devices A and B received a credit. Following the example, after these passes, device A would have 25,300 viewable pixels and device B would have 25,200 viewable pixels. In an alternative embodiment, device A may not receive credit for the passes initiated by device B or any other passes initiated by devices downstream from device B. In the illustrated example, device C does not pass the marketing item to any other devices and receives no credits.

Device D further propagates the passing of the marketing item by passing the marketing item to devices E and F. For each pass initiated by device D, each of devices A, B and D receive a credit. In the foregoing example, device A would then have 25,500 viewable pixels.

Separately, device M passes the marketing item to device N and device M receives a credit in return. Each of devices E, F and N pass the marketing item to device J. In the illustrated embodiment, the pass initiated by device E results in credit being attributed to devices A, B, D and E, the pass initiated by device F results in credit being attributed to devices A, B, D and F, and the pass initiated by device N results in credit being attributed to devices M and N. The distribution of credit may be modified when a single device receives the same marketing item from plural other devices. For instance, if device E were to pass the marketing item to device J before devices F and N passed the marketing item to device J, then only devices in the line of passes to device E may receive credit. In another embodiment, the devices in the lines of passes to devices E, F and N may receive a partial credit for the pass to device J.

Continuing with the example, device F initiates a chain of passes through devices G, H and I which continue and result in a pass to device Z. Credits may be applied to each device up the line to device Z as has been described. In another embodiment, and as illustrated, if the passes become removed from a device by a threshold number of passes in a line of passes, the removed device may not receive full credit for the pass or may receive no credit. That is, there may be less impact that a new pass has for devices further up a line of passes. For instance, if a pass is about ten or more passes removed from a device, the originally passing device (e.g., device A in the example) may not receive the same amount of credit as devices that are closer in proximity to the receiving device (e.g., device Z in the example). This may allow for actively passing devices to have access to the full marketing device faster than upstream devices. In an alternative embodiment, downstream passes may return more credit to devices that are further upstream in the line of passes to reward the initiation of a long string of passes and/or a prolific distribution of the marketing item by one or more downstream devices.

Returning to device J, device J may pass the marketing item to device O. In return, devices, A, B, D, E and J may receive a credit. Device O may pass the marketing item to P that, in turn, passes the marketing item back to J. This creates a loop in the passing of the marketing item. Other loops may be possible, such as device O passing the marketing item back to J or a more convoluted loop through multiple devices and possibly through multiple lines of passes. Loops may be identified by the marketing server 14. In one embodiment, no devices may receive credit for a pass that completes a loop. In this manner, collusive behavior among two or more users to receive credit while not propagating the spread of the marketing item may be thwarted.

As part of the data collection associated with the interactive marketing method, the recipients of the marketing item may be requested to pass the marketing item to users who may have an interest in the goods or services to which the marketing item relates. For instance, in the foregoing example where the marketing item is for a discount on denim jeans, the recipients may be asked to pass the marketing item to individuals who are known to have an affinity for denim jeans. The marketing server 14 may track which electronic devices 18 receive the marketing item from plural other electronic devices 18. The fact that the user of one device 18 receives the marketing item by the action of other users may indicate that the common recipient is fond of the product or service related to the marketing item and may be more likely to purchase the product or service than average. With this information, the merchant server 12 and/or the marketing server 14 make direct additional, targeted marketing for the product or service to the identified user. This information also may be shared with other interested parties.

In the illustrated example of FIG. 3, device J is shown as having received the marketing item from four other devices (devices E, F, N and P). The marketing server 14 may be programmed to identify the occurrence of a device being the recipient of the marketing item from multiple other devices. In order to classify the user as likely having an interest in the product or service, a threshold number of passes of the marketing item to the user's electronic device 18 may need to be registered. Also, to distinguish from a recipient that is popular among a group of people that activity pass marketing items and a recipient that may have true interest in the product or service as indicated by the perception of other users, the marketing server may track the pass activity of each electronic device 18. If one electronic device 18 is used to pass marketing items in the same or similar manner regardless of the product or service to which the marketing items relate, then those passes may not be counted or may have a reduced weighting when attempting to identify those users that have an interest in any particular product or service.

The various credit values assigned to each electronic device 18 involved in a line of passes may be assigned as settable parameters of the marketing support application 22.

In one embodiment, a provision may be made to allow the recipient electronic device to refuse or not accept the marketing item. In these situations, credit may or may not be given to the passing device and/or other electronic devices in the line of passes.

Figure 4:
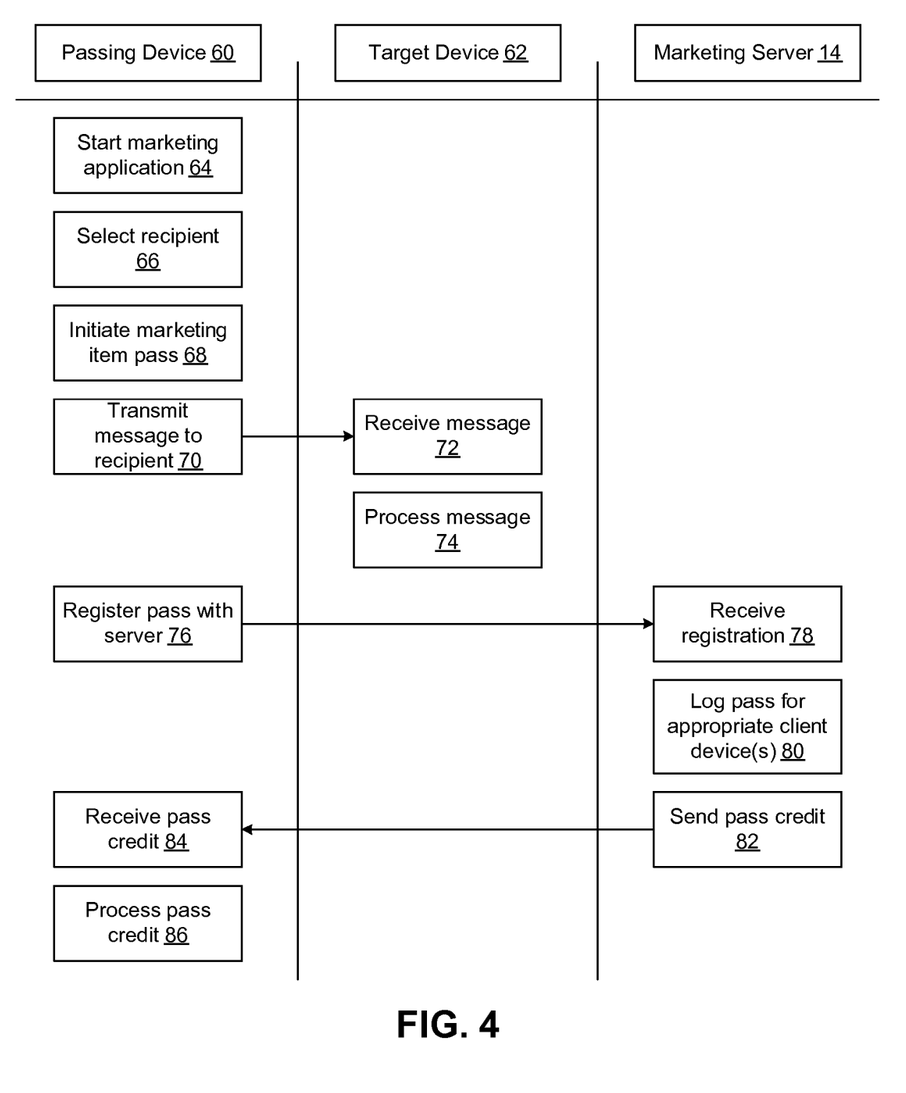
FIG. 4 is a diagram showing an exemplary interactive marketing routine carried out by components of the system of FIG. 1.

With additional reference to FIG. 4, illustrated are operations of the various components of the system 10 that may be carried out in connection with the method of interactive marketing. For purposes of this description, it will be assumed that one of the electronic devices 18 has a previously acquired the marketing item and the marketing application 24. It will be further assumed that the user of this electronic device 18 is interested in passing the marketing item to another electronic device 18. The electronic device 18 originating the pass will be referred to as a passing device 60 and the electronic device 18 that is the target of the pass will be referred to as the target device 62.

To commence the pass, the user of the passing device 60 may take steps to start (e.g., launch) the marketing application 24 in block 64, if the marketing application 24 is not already active. The marketing application 24 may be responsible for effectuating many of the functions described below. In one embodiment, the marketing application 24 may be implemented in a common protocol format, such as a JAVA script.

Following initiation of the marketing application the logical flow may proceed to block 66 where the user may take steps to select a recipient by specifying a target device 62. The selection of the recipient may include, for example, manually entering contact information for the recipient, such as an electronic mail address, a telephone number, a username, or other identifier. Alternatively, selection of the recipient may include browsing through a contact list and choosing a desired entry.

Once a target device 62 is identified, the pass of the marketing item may be initiated in block 68. Initiating the marketing item pass may involve, for example, receiving an input command from the user of the passing device 60 to carry out the pass. For instance, the input command may be a signal generated in response to user selection of a send key from the keypad 28. Next, the pass may be carried out by transmitting a message to the target device in block 70. In one embodiment, the message may be a text message. Other types of messages are possible, such as an instant message, a multimedia message or an electronic mail message. The message may contain information about the marketing item and information as to how to acquire the marketing application 24 if the target device 62 does not already have the marketing application 24.

The target device 62 may receive the message in block 72 and process the message in block 74. Processing of the message will be described in greater detail with respect to FIG. 5. In the illustrated embodiment, carrying out blocks 70 and 72 does not transfer the marketing item to the target device 62. Rather, the target device 62 has received a message representative of information relating to the marketing item. Further action, as described below, may be carried out so that the target device 62 actually receives the marketing item. In alternative embodiments, the marketing item itself may be transmitted by the passing device in block 70 and received by the target device 62 in block 72.

In addition to transmitting the message, the passing device 60 also may register the pass with the marketing server 14 in block 76. Steps to register the pass with the marketing server 14 will be described in greater detail with respect to FIG. 5. The marketing server 14 may receive the registration in block 78 and process the registration in block 80. For instance, the market server 14 may track the lines of passes and apply appropriate credit to the passing device 60 and any electronic devices in the line of passes that resulted in the passing device 60 coming into possession of the marketing item. Examples of how credit may be applied for a pass are described above with respect to FIG. 3.

In block 82, the marketing server 14 may transmit credit for the pass to the passing device 60. The credit may be transmitted in the form of a message or data push, for example. In turn, the passing device 60 may receive the credit in block 84 and process the credit in block 86 and as described in greater detail with respect to FIG. 5.

With additional reference to FIG. 5, described in greater detail are some of the logical operations carried out by an individual electronic device 18 when acting as a target device 62 and then later as a passing device 60. The logical operations may commence in block 72 where the electronic device 18 receives a message from another electronic device. As indicated, the message may contain some general information about the marketing item, such as an identity of the merchant associated with the marketing item, the goods and/or services associated with the marketing item, the nature of the marketing item (e.g., discount or rebate information) and so forth. The message may further contain information or instructions for acquiring and/or accessing the marketing item and acquiring the marketing application 24.

Next, the processing of the message (e.g., block 74 of FIG. 4) may commence. The processing of the message may include making a determination as to whether the electronic device 18 has access to the marketing application 24. This determination may be made in block 88 and may include determining if the marketing application 24 has been previously installed on the electronic device. If the electronic device 18 does not have access to the marketing application 24, a negative determination may be made in block 88 and the logical flow may proceed to block 90. In block 90, the user may be presented with a mechanism to acquire the marketing application 24. The mechanism may form part of the message and may be in the form of instructions for downloading the marketing application 24 from the marketing server 14 or in the form of a link that, if selected, will commence downloading of the marketing application 24 or open a page from which the marketing application 24 may be downloaded or otherwise accessed. Following block 90, the marketing application 24 may be downloaded in block 92.

After the marketing application 24 has been downloaded in block 92 or following a positive determination in block 88, the logical flow may proceed to block 94. In block 94, the marketing application 24 may be launched. Next, in block 96, the marketing item may be downloaded from the marketing server 14. In one embodiment, downloading of the marketing item may occur without user interaction. In another embodiment, the message that was received in block 72 may be or may contain the marketing item and steps to download the marketing item may be omitted.

Next, in block 98, the image content component of the marketing item may be displayed on the display 26. As indicated, the displayed image may be limited to portions of the content for which the electronic device 18 is entitled to display. Following the foregoing example where only a third of a newly received marketing item is configured to be displayable, then that one third portion permitted for display may be displayed in block 98. The remainder portion of the marketing item that is deemed to be non-displayable may be hidden from view, not displayed (e.g., appear as black, white or some other color), or may be displayed with a faded appearance.

In block 100, instructions for displaying the remainder of the marketing item and ultimately redeeming the marketing item may be displayed on the display 26. Also, a description of the credit values associated with each pass may be displayed. With this information, the user may determine if he or she is interested in passing the marketing item to others in an attempt to gain credit toward displaying the entire marketing item and/or redeeming the marketing item.

The logical flow may then proceed to block 102 where a determination is made as to whether the user has taken steps to make a pass of the marketing item with the electronic device 18. Exemplary steps to make a pass are described above in connection with FIG. 4 and with respect to blocks 66 (selecting a recipient), block 68 (initiating the pass), block 70 (transmitting a message), and block 76 (registering the pass with the marketing server 14).

Regardless of whether a pass is made, the logical flow may proceed to block 104 where a determination is made as to whether the electronic device has received a credit. The credit may be for a pass that was made in block 102 or may be for a pass that was made by another device and for which the electronic device 18 is entitled to credit (e.g., a pass was made by another electronic device that received a pass from the subject electronic device). If no credit has been received, the logical flow may loop back through blocks 102 and 104 until credit is received. If credit has been received, the logical flow may proceed to block 106 where the display of the marketing item is updated based on the additional portions of the marketing item that have been made available for display due to the received credit.

A determination may be made in block 108 as to whether the entire marketing item is displayable and/or available for redemption. If a negative determination is made in block 108, the logical flow may loop back to block 102. If a positive determination is made in block 108, the logical flow may proceed to block 110 where the user may redeem the marketing item with the merchant associated with the marketing item.

In one embodiment, the marketing application 24 may remain active and continue to display the displayable portions of the marketing item unless user action preempts the display of the marketing item or the user inactivates the marketing application 24. In another embodiment, the display 26 may return to displaying images as determined by a current operational mode of the electronic device 18. In this embodiment, the marketing application 24 may run in the background and, when a credit is received and additional portions of the marketing item are available for display, the marketing application 24 may override the currently displayed content in favor of the marketing item for a brief period of time. In other embodiments and/or when the marketing application 24 is not active, the user may take steps to check the status of the marketing item with the marketing server 14. For instance, the user may reactivate the marketing application 24 that, in turn, may request a credit status update from the marketing support application 22. Alternatively, the user may use any appropriate computer or electronic device to log into a website that is hosted by the marketing server 14 to check the status of any marketing items for which the user may be collecting credit.

Figure 5:
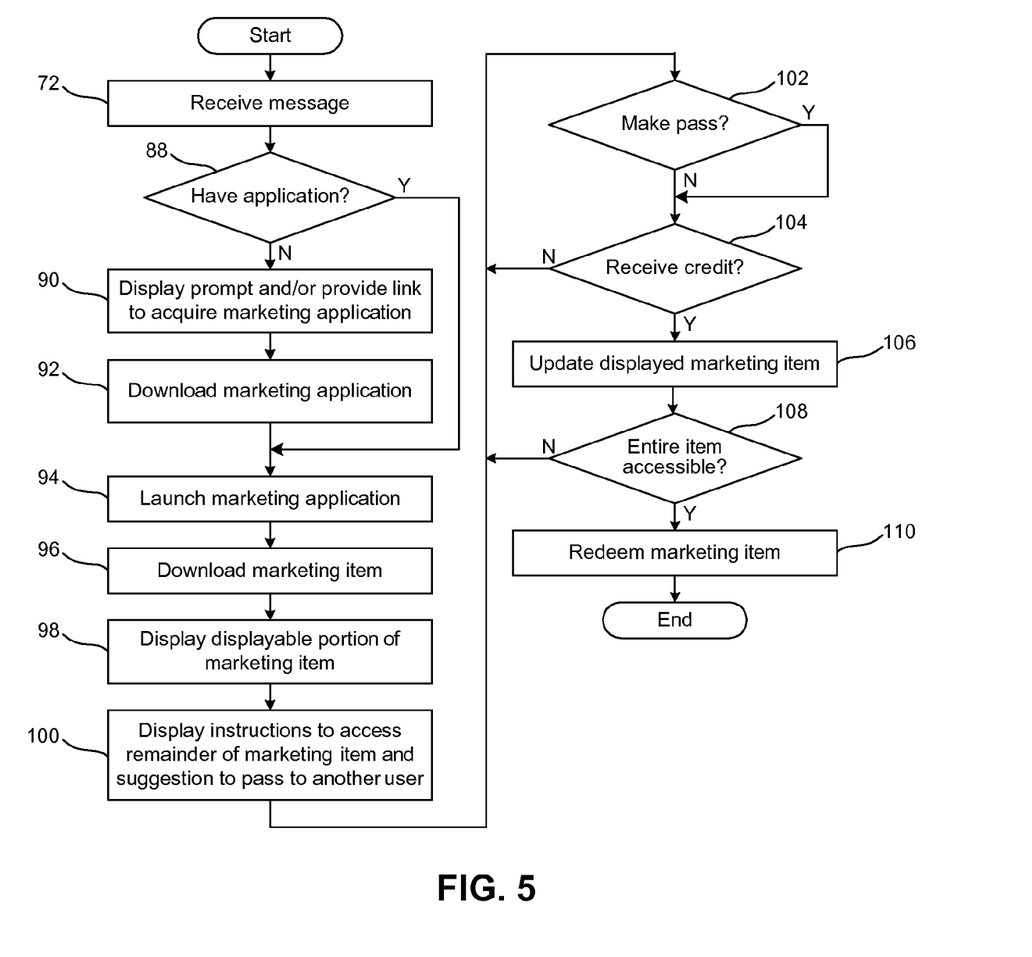
FIG. 5 is an exemplary flow diagram of functions carried out by an electronic device during the interactive marketing routine of FIG. 4.

It will be appreciated that FIGS. 4 and 5 illustrate logical operations to implement an exemplary method of interactive marketing. The exemplary method may be carried out by executing an embodiment of the marketing application 24 and/or the marketing support application. Thus, the flow charts may be thought of as depicting steps of a method carried out by one or more electronic devices 18 and/or the marketing server 14. Although FIGS. 4 and 5 show a specific order of executing functional logic blocks, the order of executing the blocks may be changed relative to the order shown. Also, two or more blocks shown in succession may be executed concurrently or with partial concurrence. Certain blocks also may be omitted.

Although certain embodiments have been shown and described, it is understood that equivalents and modifications falling within the scope of the appended claims will occur to others who are skilled in the art upon the reading and understanding of this specification.

What is claimed is:

1. A method of displaying an image in accordance with progressive user action, comprising:
   receiving an image component with a first electronic device;
   displaying an initially viewable portion of the image component on a display of the first electronic device;
   passing a data file or a message associated with the image component to a second electronic device;
   attributing credit in the form of a predetermined number of pixels to the first electronic device for the passing of the data file or message; and
   refreshing the display of the image component to display a portion of the image component that corresponds to the initially viewable portion and a portion corresponding to the attributed pixel credit.

2. The method of claim 1, wherein the image component is associated with a marketing item and the method further comprising providing a discount for a product or service in response to redemption of the marketing item by a user of one of the first or second electronic devices.

3. The method of claim 1, wherein credit resulting from a combination of passes from the first electronic device to other electronic devices and passes initiated by at least some of the other electronic devices are aggregated.

4. The method of claim 3, wherein the aggregated credit permits the first electronic device to display a portion of the image component that is larger than the initial portion of the image component and that corresponds to a value associated with the aggregated credit.

5. The method of claim 4, wherein a predetermined amount of aggregated credit permits display of the entire image component.

6. The method of claim 4, wherein a remainder portion of the image component that does not form part of the displayable portion is displayable in a faded form.

7. The method of claim 4, wherein a predetermined amount of aggregated credits qualifies a marketing item associated with the image component for redemption.

8. The method of claim 1, wherein the passing from the first electronic device to the second electronic device includes sending a message related to a marketing item from the first electronic device to the second electronic device and the second electronic device obtaining the marketing item from a server.

9. The method of claim 1, wherein additional passing attributes additional pixel credits to the first electronic device and, when a predetermined number of pixel credits are accumulated, displaying the entire image component.

10. The method of claim 1, further comprising displaying in a faded form a remaining portion of the image component that is not available for display based on the pixel credits attributed to the electronic device.

11. An electronic device in which an image is displayed in accordance with progressive user action, comprising:
    a display; and
    a control circuit configured to:
    process an image component and cause display of an initially viewable portion of the image component on the display;
    pass a data file or a message associated with the image component to a second electronic device;
    process credit in the form of a predetermined number of pixels that is attributed to the first electronic device for the passing of the data file or message; and
    refresh the display of the image component to display a portion of the image component that corresponds to the initially viewable portion and a portion corresponding to the attributed pixel credit.

12. The electronic device of claim 11, wherein additional passing attributes additional pixel credits to the electronic device and the controller is further configured to display the entire image component when a predetermined number of pixel credits are accumulated.

13. The electronic device of claim 11, wherein the controller is further configured to display in a faded form a remaining portion of the image component that is not available for display based on the pixel credits attributed to the electronic device.

* * * * *